(No Model.) 2 Sheets—Sheet 1.

H. C. WEST.
ELECTRIC CALL.

No. 581,446. Patented Apr. 27, 1897.

WITNESSES:
D. N. Hayward
Ambrose D. Merrill

INVENTOR
Hubbard C. West
BY
Henry D. Williams
ATTORNEY (No Model.) 2 Sheets—Sheet 2.
H. C. WEST.
ELECTRIC CALL.
No. 581,446. Patented Apr. 27, 1897.
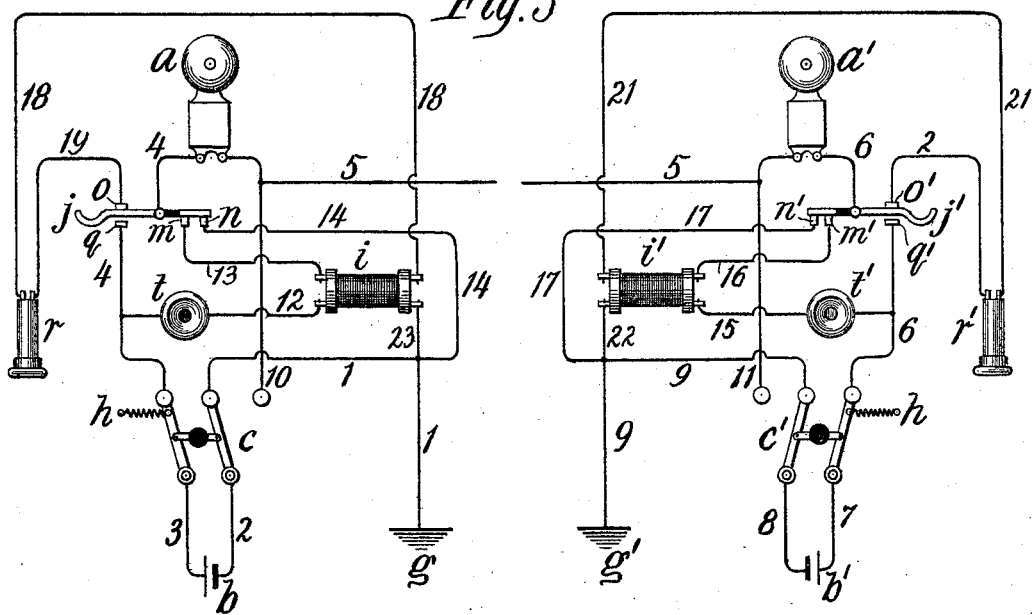
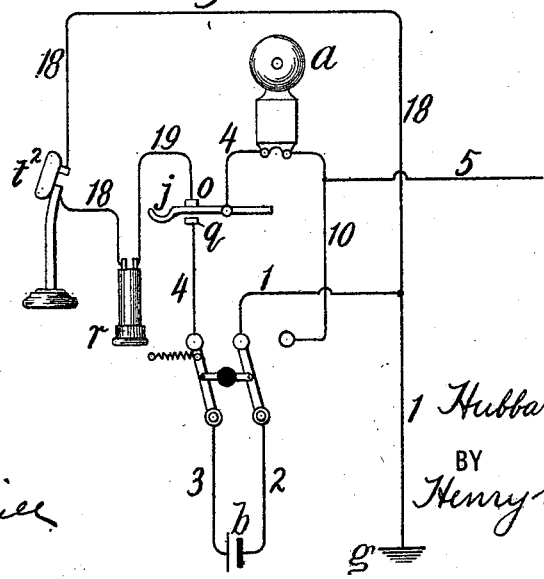
WITNESSES:
INVENTOR
Hubbard C. West
BY Henry D. Williams
ATTORNEY

UNITED STATES PATENT OFFICE.

HUBBARD C. WEST, OF NEW YORK, N. Y., ASSIGNOR OF ONE-HALF TO JOHN SCHNEIDER, JR., OF SAME PLACE.

ELECTRIC CALL.

SPECIFICATION forming part of Letters Patent No. 581,446, dated April 27, 1897.

Application filed July 29, 1896. Serial No. 600,869. (No model.)

*To all whom it may concern:*

Be it known that I, HUBBARD C. WEST, a citizen of the United States, and a resident of New York, in the county of New York and State of New York, have invented certain new and useful Improvements in Electric Calls, of which the following is a specification.

This invention relates to electric calls such as are usually denominated "battery-calls," and are adapted for use separately as annunciators, alarms, or signals or in connection with telephones or other instruments; and this invention has for its objects to provide for utilizing batteries or other sources of current at both of two stations to actuate a signaling instrument at one station, and also to provide for thus utilizing the current-generating devices at both stations through the actuation of a circuit make-and-break device at either one of the two stations, and also to provide for actuating the signaling instrument or instruments in the event of the grounding of the line or of the crossing of the circuit in any manner, thereby giving a notification that the circuits are deranged.

The nature and objects of my invention will more particularly appear from the following description of the embodiments of my invention shown in the accompanying drawings.

Figure 1:
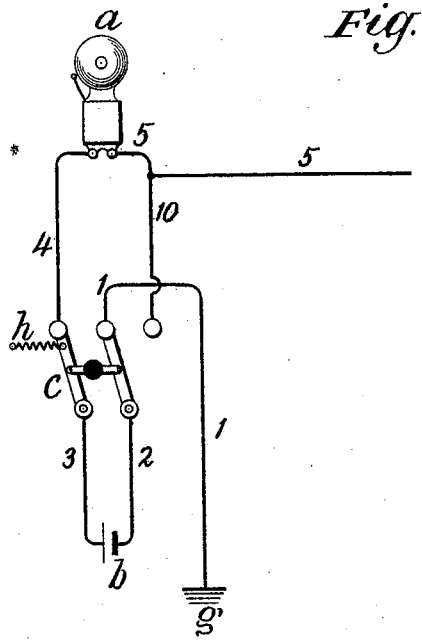
Figure 1:
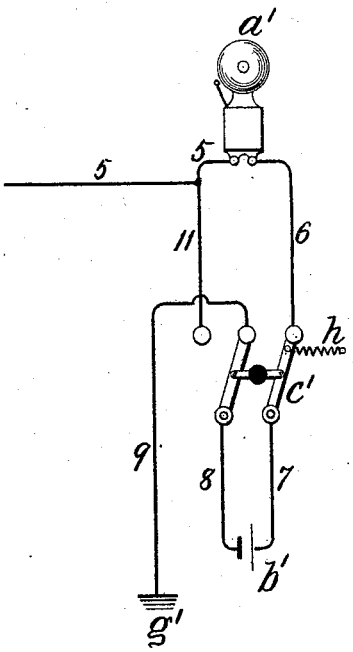
Figure 2:
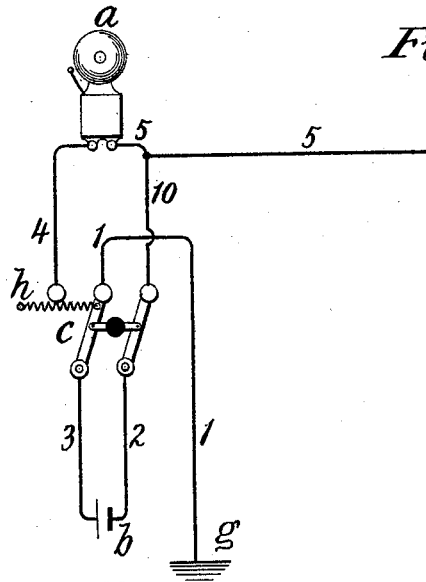
Figure 2:
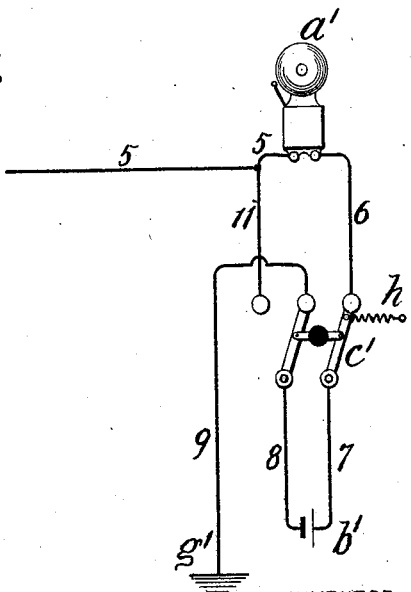

Figure 1 represents, diagrammatically, a call-bell circuit and apparatus with the circuit make-and-break devices in normal position. Fig. 2 represents the same circuit and apparatus when the circuit make-and-break device at the left-hand station has been moved into position to ring the bell at the right-hand station. Fig. 3 represents the complete telephonic circuit and apparatus, including microphonic transmitters, induction-coils, and receivers, combined with my improved call-bell circuit and apparatus, so as to employ the same line and same batteries for both calling and telephonic communication. Fig. 4 represents the instruments and connections at one station when magnetic transmitters are employed and the same line is used for both calling and telephonic communication.

The call-bells $a$ and $a'$ are represented in outline only, one call-bell being located at each station. It is of course evident that other signaling instruments (visual, audible, or otherwise) capable of giving a signal or call may be substituted for the call-bells, and in some cases it may be desirable to have but one signaling instrument at one station or elsewhere or a greater number of signaling instruments located at other places than the stations.

The batteries $b$ and $b'$, (represented in diagram,) one at each station, are the sources of electric current or the current-generating devices shown. It is of course evident that other suitable sources of electric current may be employed, but the current sources at each station should be of substantially the same strength, so that when connected, as they are normally, in opposition to each other no current sufficient to actuate the signaling instruments will flow. I have found, however, that with batteries of slightly-different strength connected in opposition the batteries will react in such a manner as to speedily attain the same strength.

The circuit make-and-break devices are shown as reversing-switches $c$ and $c'$, one at each station, each switch being composed of two connected movable bars, which will be designated as the "right" and "left" bar, respectively, and of three contact-points, which will be designated as the "right" point, "middle" point, and "left" point, respectively. It is of course evident that other suitable circuit make-and-break devices may be employed in the various applications of my invention.

The connections of the two stations, as shown, are grounded at $g$ and $g'$, respectively, and the normal calling-circuit (illustrated in Fig. 1) is from the left-hand ground $g$, through wire 1, middle point of switch $c$, right bar of switch $c$, wire 2, battery $b$, (from negative to positive,) wire 3, left bar of switch $c$, left point of switch $c$, wire 4, bell $a$, line-wire 5, then through line 5 to the right station, bell $a'$, wire 6, right point of switch $c'$, right bar of switch $c'$, wire 7, battery $b'$, (from positive to negative,) wire 8, left bar of switch $c'$, middle point of switch $c'$, and returning through wire 9 to ground at $g'$. In this normal circuit the batteries are opposed to each other and no current will flow. If, however, the line-wire becomes grounded through breakage or otherwise, or, in the event that a complete metallic circuit is employed, if the wires become crossed, the circuits of the individual batteries with their signaling instruments will be closed thereby, and thus the signaling instruments will be operated continuously until these short circuits are broken, and notice will be thereby given of the derangement of the circuit.

The operation of the signaling instruments is effected at either station by the actuation of the switch $c$ or $c'$ at that station, and each switch acts to reverse its battery, and thus the batteries may be connected in series by either switch. In Fig. 2 the switch $c$ at the left-hand station is shown moved to the right into position to actuate the call, and a circuit including both batteries is closed as follows: from the left-hand ground $g$ through wire 1, middle point of switch $c$, left bar of switch $c$, wire 3, battery $b$, (from positive to negative,) wire 2, right bar of switch $c$, right point of switch $c$, wire 10, and line-wire 5, and then through the same conductors and apparatus as heretofore described of the right-hand station, i. e., line-wire 5, bell $a'$, wire 6, right point of switch $c'$, right bar of switch $c'$, wire 7, battery $b'$, (from positive to negative,) wire 8, left bar of switch $c'$, middle point of switch $c'$, and wire 9 to ground at $g'$. The two batteries are now connected in series with the bell $a'$ and the current of both batteries will be utilized in ringing the bell.

When a person at the right-hand station wishes to signal or communicate with the left-hand station, the movable bars of the right switch $c'$ are moved to the left, and thereby the connections of the battery $b'$ with the line are reversed and the bell $a'$ is cut out of the circuit, the connection of the battery $b'$ with the line being then made through wire 11, left point of switch $c'$, left bar of switch $c'$, and wire 8, and the connection of this battery $b'$ with the ground-wire or return line-wire 9 being through middle point of switch $c'$, right bar of switch $c'$, and wire 7.

It will be observed that a person at the call-receiving station may at any time stop the ringing of the bell at that station by moving the switch at the receiving-station to the calling position, and, further, that with the switch at the receiving-station in such position a return signal or call will be given at the calling-station as soon as the switch at the calling-station is returned to normal position. When both switches are moved to the calling position, the batteries are opposed, and therefore no current is wasted. I prefer, however, to provide springs $h$ or other suitable means for restoring the switches $c$ and $c'$ to normal position as soon as they are released by the operator.

When my improved calling system is used in connection with a telephonic system, the same line-wire and the same batteries may be employed for the telephonic instruments. This is illustrated in Figs. 3 and 4. In the construction shown in Fig. 3 ordinary microphonic transmitters $t\ t'$ and ordinary magnetic receivers $r\ r'$ and ordinary induction-coils $i\ i'$ are employed. Gravity-actuated hooks $j\ j'$ of usual construction are also shown, whereby when the receivers are supported upon the hooks the calling-circuits are closed and when the receivers are removed from the hooks the calling-circuits are broken and the communicating circuits closed. The latter position is illustrated, and it will be seen that each microphonic transmitter is in circuit with its battery and the primary of the induction-coil, while both receivers are in a closed circuit including the secondaries of both induction-coils. The circuits may be traced as follows: that of left-hand transmitter $t$ from battery $b$ through wire 3, left bar of switch $c$, left point of switch $c$, wire 4, transmitter $t$, wire 12, primary coil $i$, wire 13, contact-stop $m$, right-hand end of switch-hook $j$, contact-stop $n$, wire 14, wire 1, middle point of switch $c$, right bar of switch $c$, and wire 2 back to battery $b$; that of right-hand transmitter $t'$ from battery $b'$ through wire 7, right bar of switch $c'$, right point of switch $c'$, wire 6, transmitter $t'$, wire 15, primary of coil $i'$, wire 16, contact-stop $m'$, left-hand end of switch-hook $j'$, contact-stop $n'$, wire 17, wire 9, middle point of switch $c'$, left bar of switch $c'$, and wire 8 back to battery $b'$, and that of the receivers from the secondary of coil $i$ through wire 18, receiver $r$, wire 19, contact-stop $o$, left-hand portion of switch-hook $j$ to the pivot-pin thereof, wire 4, bell $a$, line-wire 5, bell $a'$, wire 6, pivot of switch-hook $j'$ and right-hand portion thereof, contact-stop $o'$, wire 20, receiver $r'$, wire 21, secondary of coil $i'$, wire 22, wire 9, to ground at $g'$ and from ground at $g$ through wire 1 and wire 21 back to secondary of coil $i$.

It will be observed that the calling-circuits as shown in Fig. 3 are broken only at one point at each station, the breaks being in the wire 4 at the left station between stop $q$ and hook $j$ and in the wire 6 at the right station between stop $q'$ and hook $j'$, and that when the receivers are returned to their respective hooks these breaks are closed; also, the actuation of the hooks by the receivers will break the receiver-circuits at $o$ and $o'$ and will break the transmitter-circuits at $m$ and $n$ and at $m'$ and $n'$, respectively.

In the arrangement shown in Fig. 4 a magnetic transmitter $t^2$ is employed, interposed in the wire 18, and no induction-coils or battery connections are employed or required in the communicating circuit. The parts corresponding to those in Fig. 3 are correspondingly lettered, and no further description is therefore necessary.

I am aware that call-circuits have heretofore been devised with batteries normally in opposition to each other and adapted to be connected in series by actuation of a push-button at either station, but such circuits have included the signaling instruments at both stations in the circuit closed by the call-transmitting device at either station and have been of different construction from my improved system. By my improved construction a saving is effected in battery-power, as only the signaling instrument at the distant station is in the circuit, and the local signaling instrument being cut out its resistance has not been overcome by the batteries.

What I claim as new, and desire to secure by Letters Patent, is—

1. An electric call comprising two separate sources of electric current located at two electrically-connected stations, one at each station, said sources of electric current being normally connected in opposition to each other, a signaling instrument at each station, a reversing-switch at each station, and connections from each of said reversing-switches excluding the signaling instrument at the same station whereby upon the actuation of the switch the sources of electric current are connected in series to actuate the signaling instrument of the other station, substantially as set forth.

2. An electric call comprising two batteries located at two stations, one at each station, a call-bell at each station, a switch at each station, each switch having three contacts, the middle contact being connected to line and the end contacts being joined by a conductor including the call of the station, and each switch also having two contacts movable relatively to said three contacts and connected by a conductor including the battery, said latter contacts adapted to close with one end and the middle contact or with the other end and the middle contact of the three contacts first mentioned, and the normally open end contact of said three contacts being connected to line, whereby the call-receiving circuit at each station includes the call thereof and the call-transmitting circuit of each station excludes said call, substantially as set forth.

Signed at New York, in the county of New York and State of New York, this 27th day of July, A. D. 1896.

HUBBARD C. WEST.

Witnesses:
HENRY D. WILLIAMS,
JOHN SCHNEIDER, Jr.